United States Patent [19]
Ross

[11] Patent Number: 5,557,878
[45] Date of Patent: Sep. 24, 1996

[54] FISHING LINE FLOAT WITH DEPTH METERING FUNCTION

[75] Inventor: Charles A. Ross, Baltimore, Md.

[73] Assignee: American Sport Lure, Inc., Kingsville, Md.

[21] Appl. No.: 335,545

[22] Filed: Nov. 7, 1994

[51] Int. Cl.⁶ ................................................. A01K 91/00
[52] U.S. Cl. ....................................... 43/43.11; 43/44.87
[58] Field of Search .............................. 43/43.11, 44.87, 43/44.88, 44.91, 44.92

[56] References Cited

U.S. PATENT DOCUMENTS

| | | | |
|---|---|---|---|
| 1,982,573 | 11/1934 | Coyne . | |
| 2,190,113 | 2/1940 | Chreitzberg | 43/44.91 |
| 2,728,161 | 12/1955 | Mangel | 43/43.11 |
| 3,443,336 | 5/1969 | Reese | 43/44.88 |
| 3,673,729 | 7/1972 | Lintz | 43/43.11 |
| 3,800,460 | 4/1974 | Holder | 43/44.9 |
| 4,251,941 | 2/1981 | Howard | 43/43.11 |
| 4,477,995 | 10/1984 | Fenn | 43/43.11 |
| 5,440,831 | 8/1995 | Chandler | 43/43.11 |

FOREIGN PATENT DOCUMENTS 0714270  7/1965  Canada .................................. 43/43.11

Primary Examiner—Jack W. Lavinder
Assistant Examiner—James Miner
Attorney, Agent, or Firm—Rankin, Hill, Lewis & Clark

[57] ABSTRACT

A depth metering float for use with a fishing line, the float having upper and lower outer shell sections rotatable relative to one another and a carriage assembly located within the shell and adapted for rotation about a central axis relative to the shell. The fishing line is passed through the interior of the float and a brake mechanism associated with the carriage assembly serves to selectively clinch the fishing line to stop passage thereof through the float when a desired depth is reached. Located within the carriage assembly is a buoyant drum that rotates about a drum axis perpendicular to the central axis. The fishing line engages the drum so that the drum turns as the fishing line descends. A gear train connects the drum to the carriage and rotary movement of the carriage relative to the shell assembly ultimately actuates the brake mechanism to clinch the fishing line after a predetermined amount of drum rotation.

8 Claims, 7 Drawing Sheets

5,557,878

FISHING LINE FLOAT WITH DEPTH METERING FUNCTION

This invention relates to fishing line floats or bobbers and especially to a depth metering float capable of measuring a preselected length of line to be passed therethrough so as to position the end of the line (and hook) at a predetermined water depth. More particularly, the invention relates to a depth metering float with a unique mechanism for setting a preselected depth and for clinching the line at the float in response to the setting, as well as for the alternate use of determining the overall water depth at the location of the float.

A major advantage of a spool-type float or bobber over a fixed position float or bobber is the ability to draw the hook end of the line up to the float as the float is being realed in to the rod. In this manner, the float and the hook may be cast as a unit into the water, thereby permitting more accurate and extended casts than those obtained with fixed positioned bobbers. Once cast, the spool-type float or bobber permits the baited end of the line to be sent into the water a preselected distance.

In order to accomplish this, it is necessary for the float metering mechanism to permit the user to set a predetermined depth so that when the fishing line and float are cast into the water, the mechanism meters a predetermined length of fishing line therethrough and at the desired point, clamps or clinches the line to the float so that the end of the line (and hook) will be located at the desired depth below the float.

The device of the present invention provides a unique mechanism for accomplishing the purpose described and affords other features and advantages heretofore not obtainable.

SUMMARY OF THE INVENTION

The depth metering float or bobber of the invention includes a shell assembly having a central axis and comprising upper and lower shell sections rotatable relative to one another about the central axis. The assembly defines a pair of polar openings, one at each axial end thereof. Located within the shell assembly is a carriage assembly having an upper spindle and lower spindle each of which extends through one of the openings in the shell assembly. The carriage assembly is adapted for rotation about the central axis relative to the shell assembly in order to accomplish the metering function.

The fishing line is passed axially through the spindles and through the interior of the float. A primary brake mechanism associated with the upper spindle serves to selectively clinch the fishing line to the float to stop passage of the line through the float when a desired depth is reached.

Located within the carriage assembly is a buoyant drum assembly which is journaled for rotation about a drum axis that is perpendicular to the central axis. The drum assembly is adapted to have at least one convolution of the fishing line wrapped therearound so that as the fishing line passes through the spindles, the drum assembly rotates about the drum axis.

A gear reduction means is connected between the drum assembly and the carriage assembly so that the carriage rotates relative to the shell assembly about the central axis in response to the translation of the fishing line through the spindles. The device further includes means responsive to a predetermined rotary movement of the carriage assembly relative to the shell assembly for actuating the primary brake mechanism to clinch the fishing line to the float at a desired location.

DESCRIPTION OF THE PREFERRED EMBODIMENT

Figure 1:
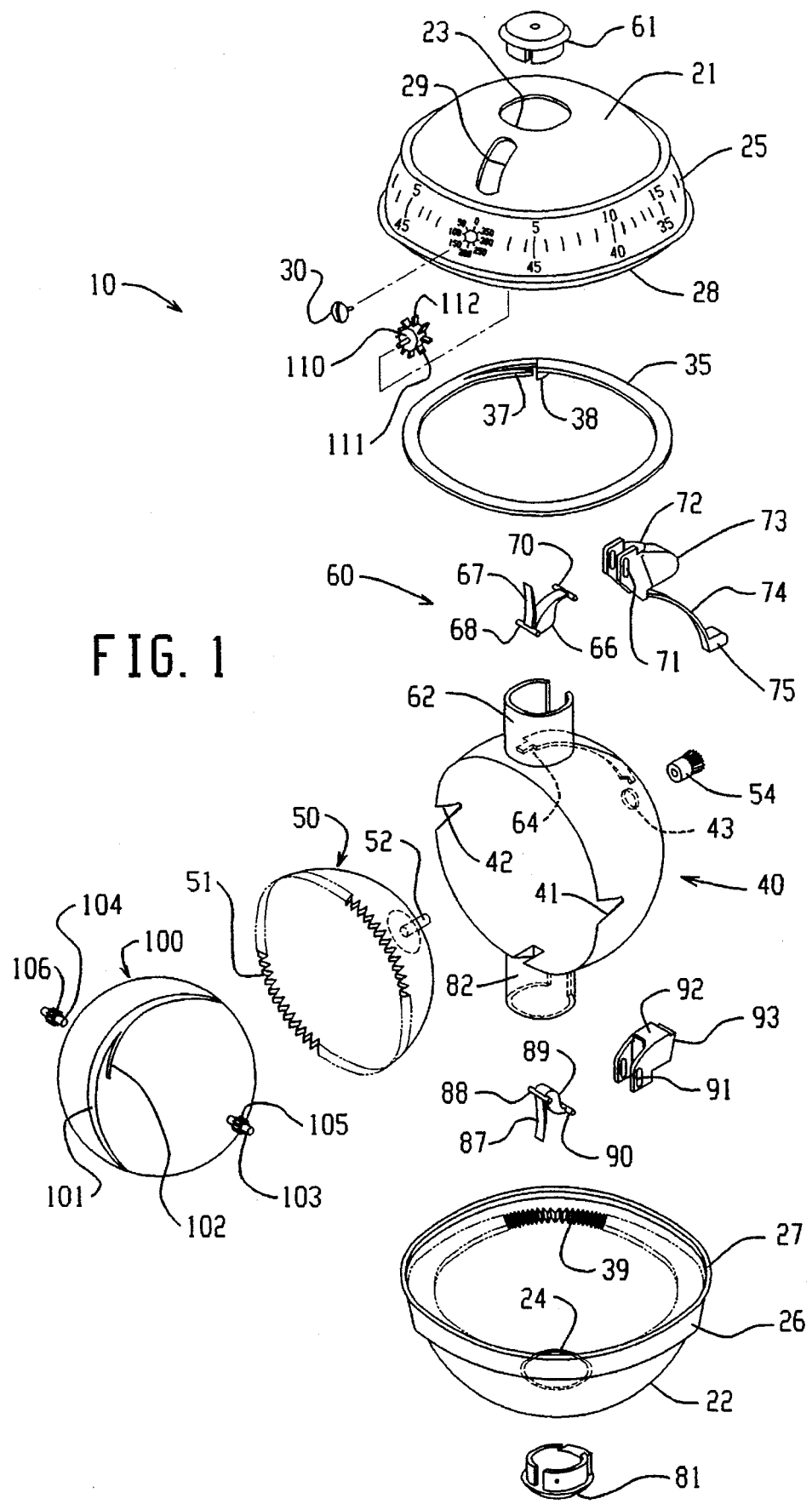
FIG. 1 is an exploded isometric view of a fishing line float assembly embodying the invention.
Figure 2:
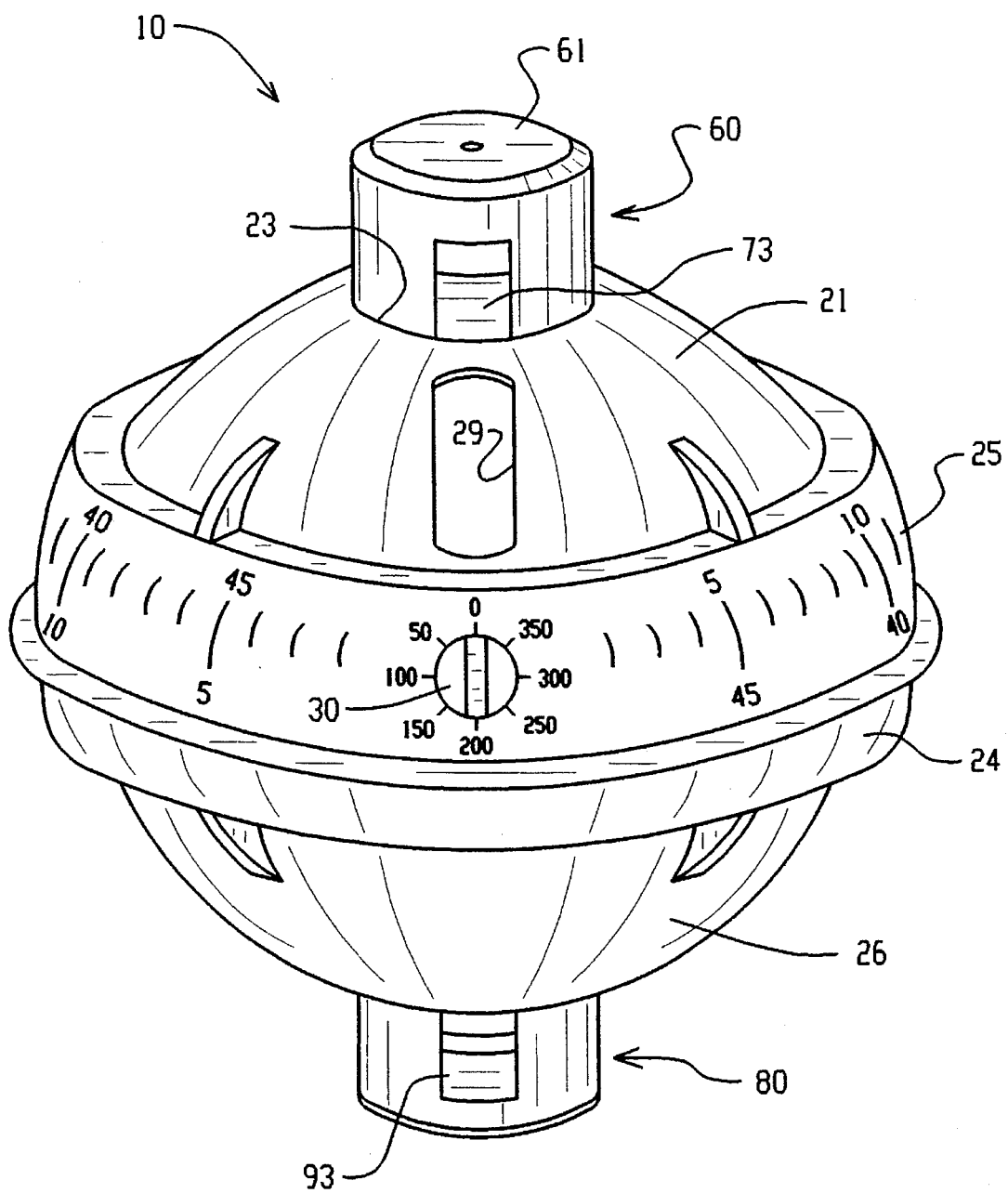
FIG. 2 is an isometric view of the assembled fishing line float assembly of FIG. 1.

Referring more particularly to the drawings and initially to FIGS. 1 and 2, there is shown a depth metering fishing line float assembly 10 embodying the invention and adapted to be located on a fishing line 11. The fishing line is threaded through the float assembly wherein it is wrapped around a drum member so as to provide a means for measuring the length of line that passes through the float assembly as the outer end or hook end of the fishing line descends into the water. After a preselected length of line has passed through the float assembly, a braking mechanism clinches the line to the float so as to hold the bottom of the line (the hook end) at the desired depth. The assembly provides a means for selecting the depth and for actuating a brake or gripping mechanism in response to the passage of a predetermined length of fishing line through the float assembly.

GENERAL ARRANGEMENT

The float assembly 10 includes as its primary components a shell assembly 20 of generally spherical shape, a carriage assembly 40 located for the most part, within the shell assembly 20, a hemispherical gear 50 located within the carriage assembly 40, an upper spindle assembly 60 which includes a primary brake mechanism, a lower spindle assembly 80 that includes a secondary brake mechanism, and a drum assembly 100 having a generally spherical shape and which is hollow to provide the buoyancy required. The shell assembly 20, carriage assembly 40, hemispherical gear 50 and drum assembly 100 are all concentric. The shell assembly 20 and carriage assembly 40 define a central axis that is in practice, generally vertical or upright and the drum assembly 100 defines a lateral axis of rotation that is perpendicular to the central vertical axis.

SHELL ASSEMBLY

The shell assembly 20 includes an upper shell section 21 and a lower shell section 22 both of which are generally hemispherical in shape. In assembled relation, the sections 21 and 22 define a generally spherical shell with an upper circular opening 23 and a lower circular opening 24. The sections are also rotatable relative to one another to accomplish the operations to be described below. The upper shell section 21 has an equatorial portion 25 that is radially enlarged and adapted to match an equatorial portion 26 in the lower section 22 which is correspondingly radially enlarged. Also the lower shell section 22 has a snap bead 27 formed around its perimeter that is adapted to be snapped into an annular channel 28 formed in the upper equatorial portion 25. With the shell sections 21 and 22 snapped together in this way, adequate retention is provided, however, relative rotation between them can be easily accomplished.

The upper shell 21 is preferably fabricated of a transparent thermoplastic material while the lower shell section 22 is similarly fabricated of thermoplastic material which need not be transparent.

Figure 13:
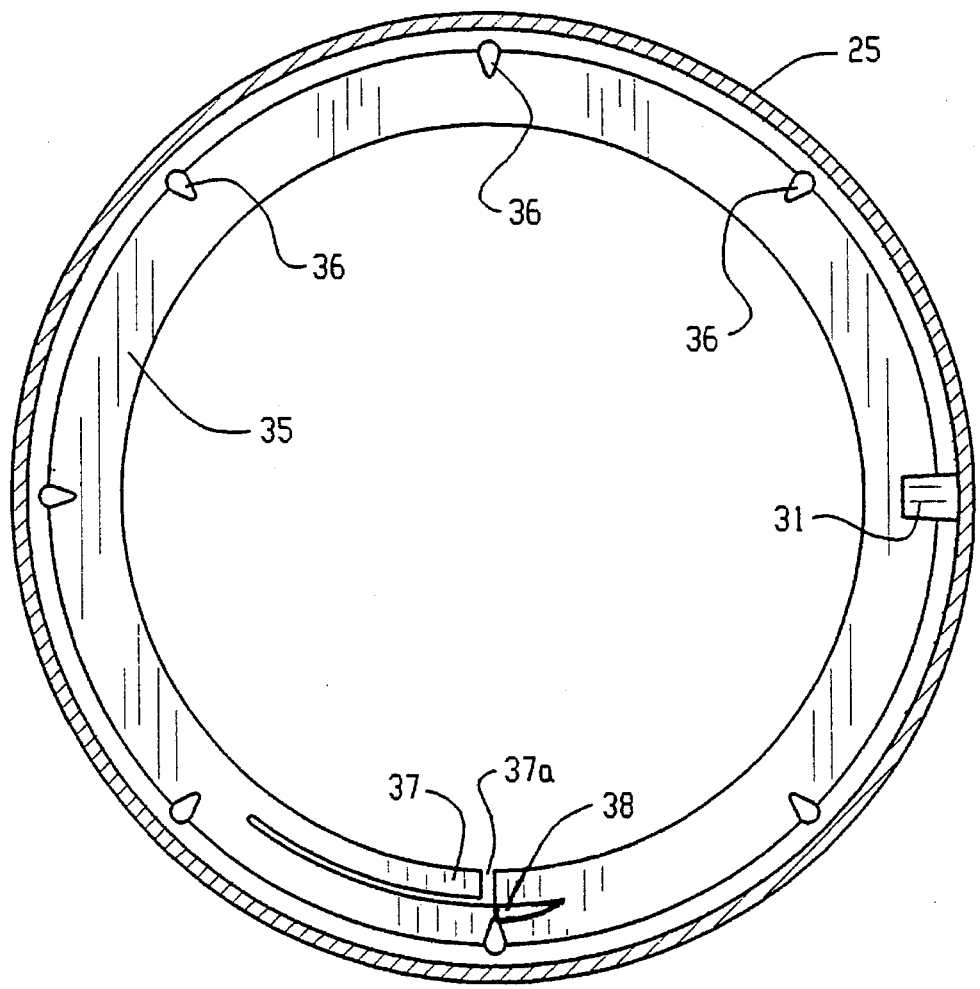
FIG. 13 is a sectional view from below also illustrating the location and construction of the depth ring.

The upper shell 21 has a starter slot 29 formed therein, the purpose of which will be described below. An indexer knob 30 is rotatably mounted on the enlarged portion 25 and has a stem that extends through an opening in the shell wall for a purpose to be described below. Surrounding the knob 30 is an indexer scale. The enlarged portion 25 also has an indexer stop 31 best shown in FIG. 13 and a metering scale marked thereon and which increases from left to right as viewed in FIG. 1. Below the metering scale is a depth scale which increases from right to left as viewed in FIG. 1.

Referring to FIGS. 1, 7, 8, 12 and 13, a depth ring 35 is slidably positioned in the enlarged portion 25 at the upper portion thereof and retained in place by retaining fingers 36. The means of retention permits the ring 35 to rotate relative to the upper shell section 21. The ring includes a spring tang 37 which extends somewhat downwardly out of the plane of the ring, an indicator groove 37a and an index tab 38 best shown in FIGS. 1 and 8. The depth ring 35 is a thin, flat, annular ring which can be easily flexed to snap it into position within the upper shell section 21.

The lower shell section 21 has an annular gear rack 39 formed therein within the radially enlarged portion 26 as best shown in FIGS. 1, 5, 6 and 8. The gear rack 39 is used in a matter to be described below to cause the carriage assembly 40 to revolve relative to the shell assembly 20 in response to the passage of fishing line through the float assembly.

THE CARRIAGE ASSEMBLY

The carriage assembly 40 has a main body of generally hemispherical shape with portions of the wall cut out if desired. The outside radius of the main body is slightly less than the inside radius of the outer shell assembly in order to permit the carriage to rotate about the central vertical axis relative to the shell assembly 20. The assembly 40 includes an upper spindle assembly 60 and lower spindle assembly 80 secured at its upper and lower portions, the spindle assemblies 60 and 80 extending through the upper opening 23 and lower opening 24 respectively formed in the shell sections 21 and 22.

Figure 8:
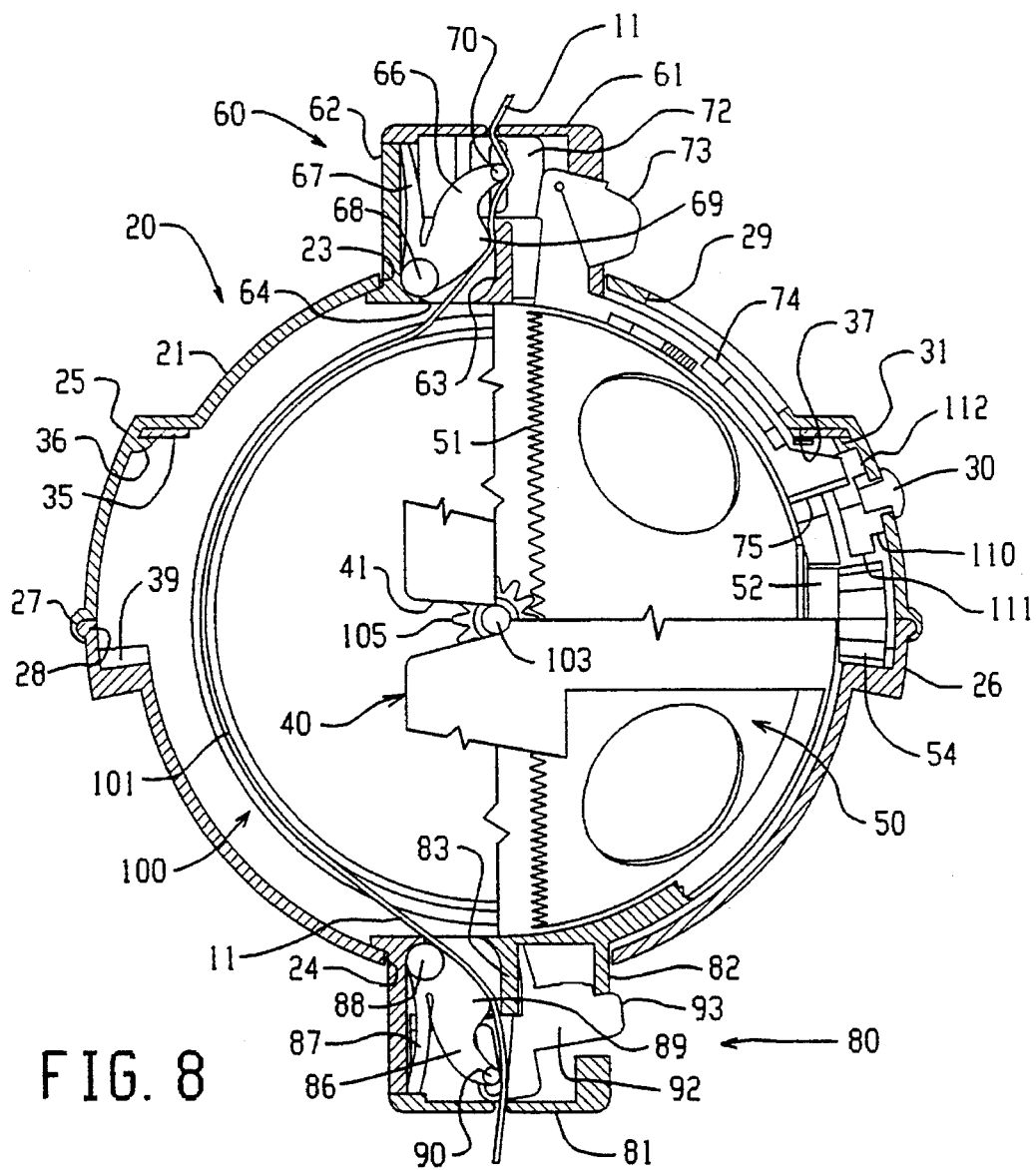
FIG. 8 is a sectional view on an enlarged scale but showing the carriage assembly in broken elevation and the hemispherical gear and drum assembly in full elevation while also showing the primary brake mechanism in the closed braking position and the lower braking mechanism in the released position.

As shown in FIGS. 1 and 8, the carriage main body has a pair of axially opposed slots 41 and 42 configured to provide a retainer and bearing means for the axle pins of the drum assembly 100. The slob 41 and 42 permit the drum axles to be slid into a mounted position for rotation relative to the carriage assembly 40. With this arrangement, the drum assembly 100 rotates about the drum axis which is perpendicular to the central vertical axis of rotation of the carriage. The carriage assembly also has a bearing hole 43 formed therein in alignment with a radial line that intersects the drum axis midway between the slots 41 and 42.

Figure 6:
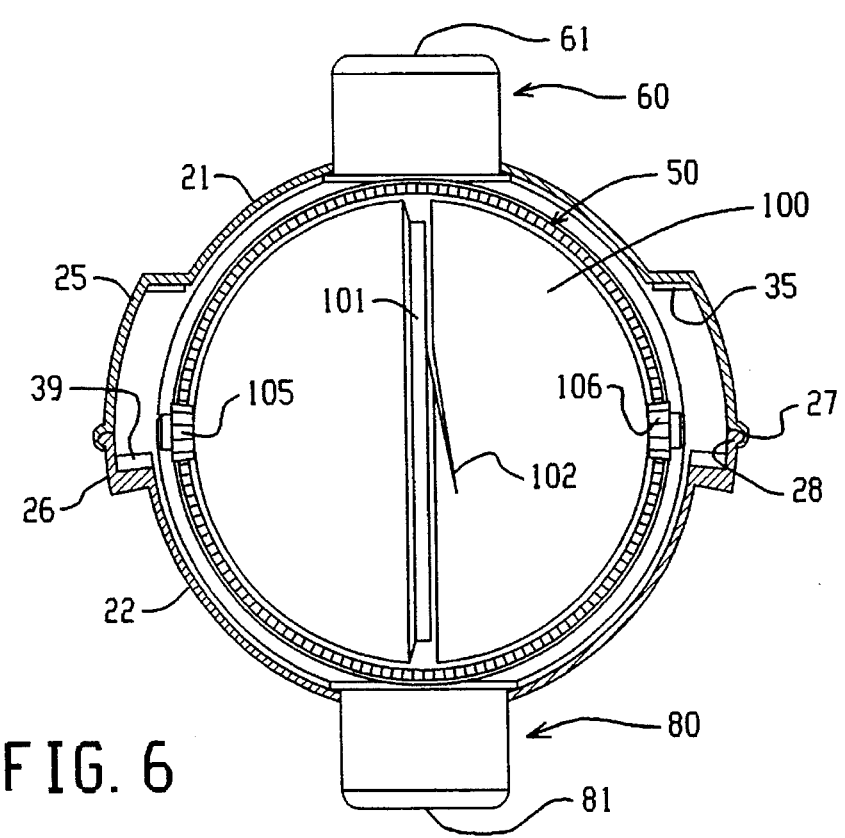
FIG. 6 is a sectional view taken on the line 6—6 of FIG. 5 but showing the upper and lower spindles in elevation.
Figure 7:
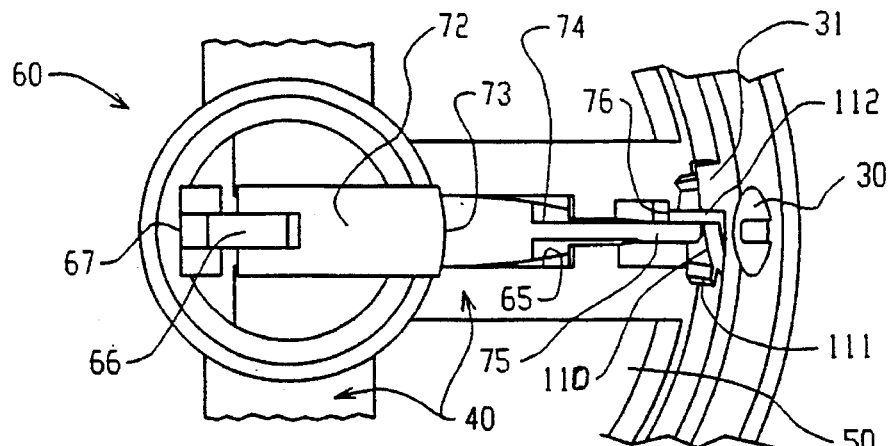
FIG. 7 is a fragmentary elevational view on an enlarged scale with parts broken away and shown in section for the purpose of illustration.

Rotatably mounted within the carriage assembly 40 is hemispherical gear 50 best shown in FIGS. 1, 6 and 8. The gear 50 has axially extending gear teeth 51 formed around its circumferential edge as illustrated in FIGS. 1 and 8 and a drive spindle 52 that extends outwardly from the polar area and through the bearing hole 43 along the axis of rotation of the gear 50 which intersects the drum axis midway between the drum mounting slots 41 and 42. Accordingly, as the hemispherical gear 50 rotates about its axis, the spindle 52 which extends through the opening or bearing hole 43, rotates. A drive gear 54 is fixed to the spindle 52 so as to be driven by the hemispherical gear. The drive gear 54 engages the rack teeth 39 formed in the lower shell section. Thus, the rotation of the hemispherical gear 50 serves to turn the drive gear 54 which in turn causes the carriage assembly 40 to rotate about the central vertical axis relative to the outer shell.

As the carriage assembly 40 rotates its upper and lower spindle assemblies 60 and 80 also rotate about the central vertical axis. It will be noted that the carriage assembly 40 has upper and lower bearing portions that protrude slightly from the hemispheric surface to provide bushings to aid in rotation of the spindle assemblies 60 and 80 relative to the shell assembly 20.

Figure 3:
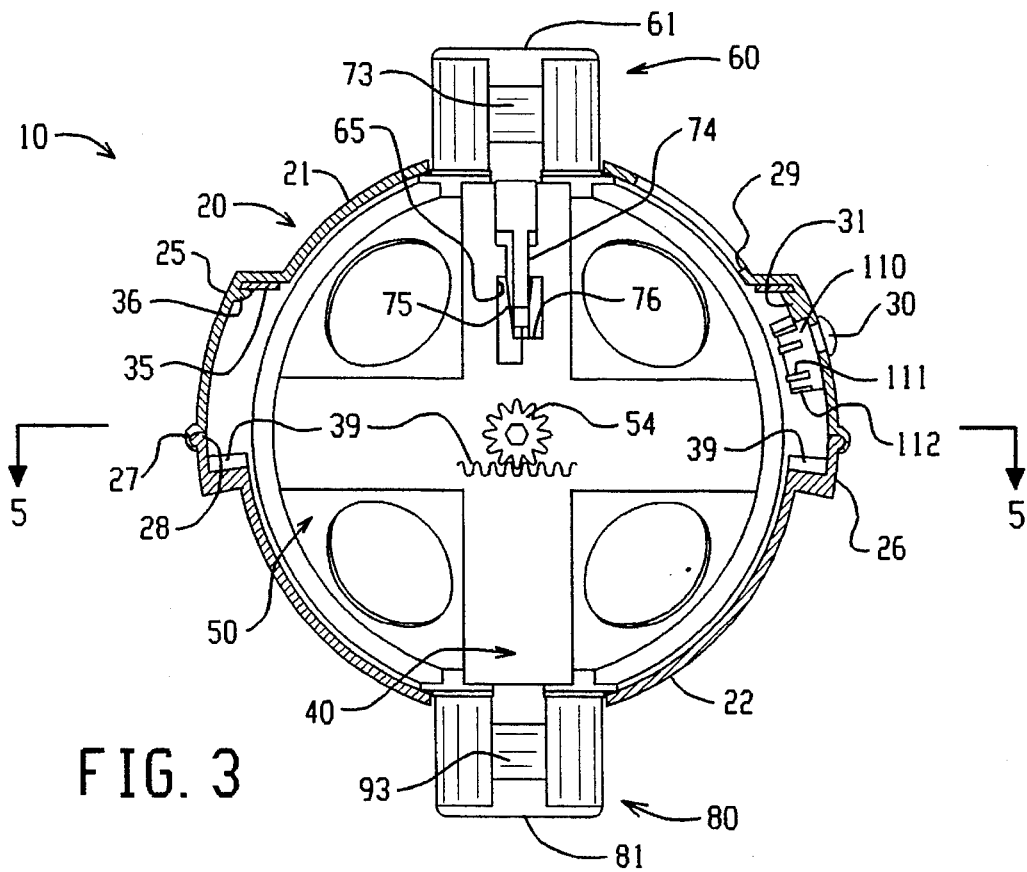
FIG. 3 is a side elevation of the fishing line float of FIGS. 1 and 2 with the shell broken away and shown in section for the purpose of illustration and showing the brake trigger mechanism in the open position.
Figure 4:
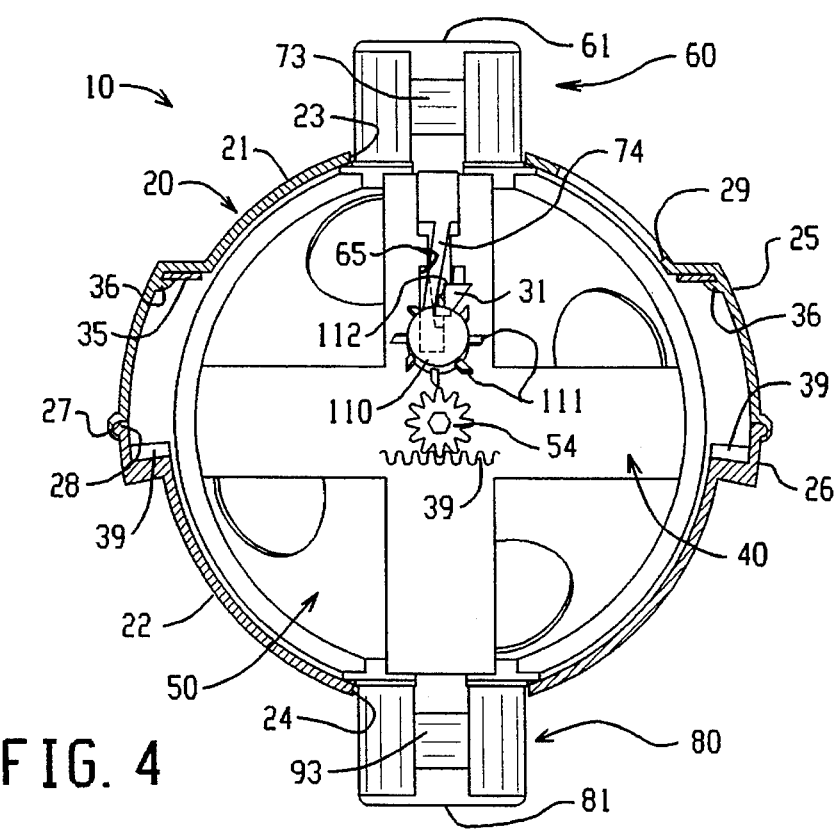
FIG. 4 is an elevational view similar to FIG. 3 with the outer shell assembly broken away and shown in section for the purpose of illustration and showing the brake trigger mechanism in the triggered or closed position.

The upper spindle assembly 60 has an upper spindle cap 61 with a central opening through which the fishing line is threaded as illustrated in FIG. 8. The main function of the upper spindle assembly 60 is to house the primary brake mechanism best illustrated in FIGS. 7, 8, 9 and 10. The brake mechanism includes a cylindrical housing 62 and a primary anvil 63 which is integral with the carriage assembly 40 and which remains in a relatively stationary position during operation of the primary brake mechanism. A slot 64 is formed through the wall portion of the carriage located within the spindle assembly 60 so as to communicate through to the interior of the carriage assembly 40. The carriage also has a trigger slot 65 formed therein which will be further discussed below. The trigger slot has a detent shoulder as shown in FIGS. 3 and 4.

The primary brake mechanism includes a brake operating member 66 which includes a spring tail 67, a pivot bar 68, a brake shoe 69 and trigger bar 70. The spring tail 67 is resiliently pivotable relative to the rest of the brake member 66 so that in operating position, it urges the brake shoe 69 against the anvil 63 to clinch the fishing line 11 therebetween. The pivot bar serves as a hinge about which the brake member 66 pivots between engaged and released positions.

The trigger bar 70 is received in a pair of slots 71 in trigger member 72. The trigger member 72 includes a reset button 73, a trigger arm 74, a trigger foot 75 and trigger flanges 76. The reset button 73 is rotatably connected to the trigger member 72 by a hinge portion to permit some flexing relative to the rest of the trigger member. The trigger member 72 has a recess formed therein to allow it to straddle the anvil 63.

With this arrangement, the brake shoe 69 is normally urged into engagement with the anvil 63 by the spring tail 67, however, when the trigger member 72 is moved to the left as viewed in the drawings, this urges the trigger bar 70 in a direction tending to take the brake shoe 69 out of braking engagement with the anvil 63. This releasing movement can also be accomplished by pressing the reset button 73.

It should be noted, however, that the brake mechanism is normally retained in the released condition due to the position of the trigger member 72, portions of which are received in the trigger slot 65 in the manner best illustrated in FIGS. 7, 8, 9 and 10. As shown in FIG. 3, the trigger member has a trigger arm 74 which is retained in a released position by engagement of a trigger foot 75 with a detent shoulder 76 formed in the trigger slot 65. This enables the fishing line to be passed through the float because the brake mechanism is held in a released condition.

When the trigger arm 74 is flexed so as to move it away from the detent shoulder 76 as illustrated in FIG. 4, the resilient force resulting from the spring tail 67 forces the brake 69 shoe into engagement with the anvil 63 and at the same time, forces the trigger foot 75 downward to a released condition illustrated in FIG. 4.

Figure 10:
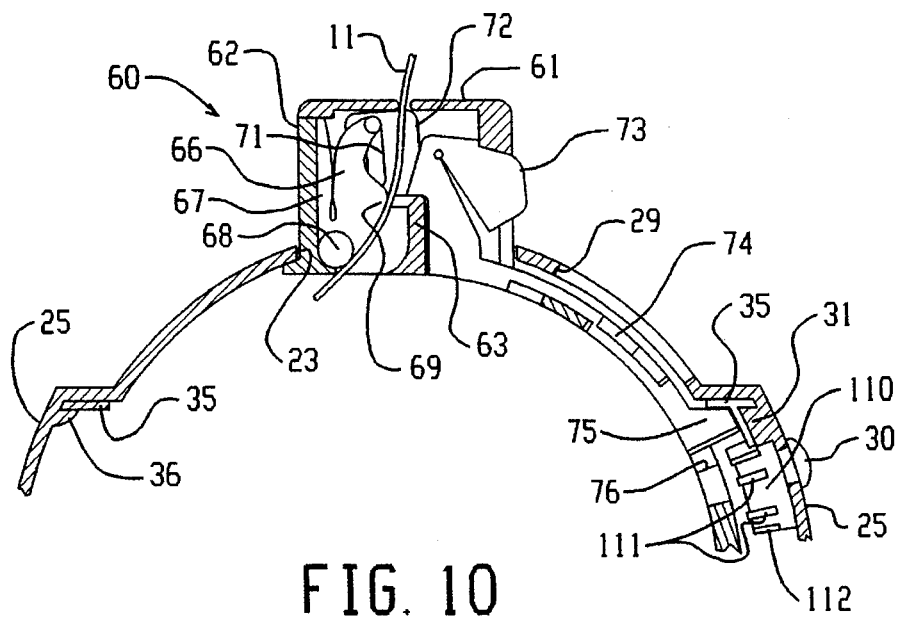
FIG. 10 is a fragmentary sectional view illustrating the upper brake mechanism locked in the released position.

The reset button 73 may be depressed and moved to the position shown in FIG. 10, whereto the button pivots about the hinge connection to bring it into a locked position relative to the brake housing 62 as shown. This same action brings the trigger arm 74 into a locked position as shown in FIG. 3. In this position, the trigger foot 75 is spaced far enough above the indexer wheel 110 so as not to contact the indexer ribs 111. The index tab 38 on the depth ring 35 will, however, engage the indexer ribs 111. The trigger foot 75 will engage the spring tang 37 so as to rotate the depth ring.

Figure 9:
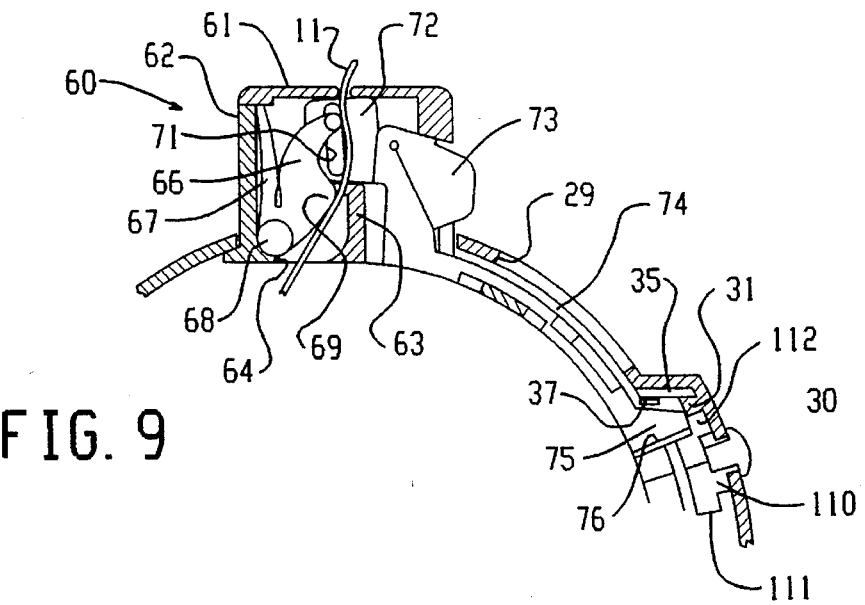
FIG. 9 is a fragmentary sectional view on an enlarged scale illustrating the upper brake mechanism in the released position.

Prior to use however, the reset button 73 is depressed to release it from the detent position shown in FIG. 10 so that it moves to the position shown in FIGS. 3 and 9. In this position, the spring tail 67 causes pivotal movement of the brake shoe 69 so that the trigger member 72 partially extends to the point where the trigger foot 75 engages the detent shoulder 76.

Figure 11:
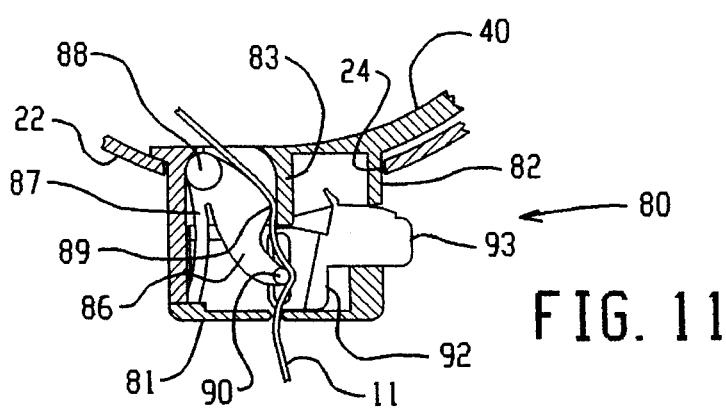
FIG. 11 is a fragmentary sectional view on an enlarged scale illustrating the lower braking mechanism in the closed braking position.
Figure 12:
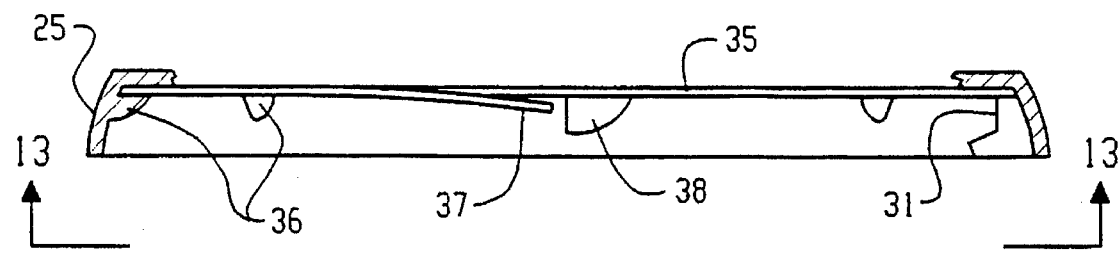
FIG. 12 is a fragmentary sectional view illustrating the depth ring and the mounting thereof in the upper shell.

The lower spindle assembly 80 is best illustrated in FIGS. 8 and 11. The braking function is essentially the same as that in the primary brake mechanism. The mechanism includes an anvil 83, a brake operating member 86, having a spring tail 87, pivot bar 88, and a brake shoe 89. A latch button 93 extends through a hole in the spindle assembly wall 82. Also, the lower spindle assembly 80 has a lower spindle cap 81 with a central opening through which the fishing line 11 exits the float assembly 10. The lower brake mechanism does not include a trigger mechanism.

DRUM ASSEMBLY

The drum assembly 100 essentially comprises a hollow buoyant sphere with an equatorial groove 101 formed therein. The groove has sufficient width to accommodate two side-by-side portions of fishing line 11. As indicated in FIG. 8, the fishing line is wrapped more than one full convolution around the drum and in the groove 101 so that as the fishing line passes through the float it rotates the drum about the drum axis. The surface of the drum also has a clinch groove 102 that tapers to a point so as to allow a portion of the fishing line to be clinched therein. This feature is useful during the threading process by which the fishing line is threaded through the upper and lower spindles and positioned in an operating position in the groove 101 around the drum.

The drum has a pair of spindles 103 and 104 integral therewith, which are received in the slots 41 and 42 formed in the carriage so that the spindles are essentially journaled to permit rotation of the drum about its axis. Mounted on the spindle 103, is a drive gear 105 which is fixed thereon. Mounted on the other spindle 104, is an idler gear 106 which rotates freely on the spindle 104. The spindles both engage the gear teeth 51 formed on the hemispherical gear 50. Accordingly, the rotation of the drum, rotates the drive gear 105 which in turn engages the gear teeth 51 (with a substantial gear reduction ratio) to rotate the hemispherical gear 50. The gear 50 through its drive spindle rotates the gear 54 while in engagement with the rack teeth 39 formed in the lower shell section 22 so that the carriage and upper and lower spindles 60 and 80 rotate relative to the shell assembly 20 with a substantial gear reduction relative to the drum. In a typical arrangement, a gear reduction of about 100 to 1 is achieved with this arrangement. In other words, one full rotation of the drum produces a 3½° rotation of the carriage assembly relative to the shell assembly.

LINE METERING SYSTEM

The metering system of the device includes an indexing wheel 110 mounted on the shaft of the indexer knob 30. The wheel has six symmetrically spaced radially extending indexing ribs 111. The wheel, however, has one jam rib 112 which is larger than the indexing ribs 111 and located at one of the radial positions so that it is otherwise symmetrically located relative to the six indexing ribs 111. The indexing ribs are formed at a location radially inward relative to the assembly so that they are not engaged by the indexer stop 31 located on the upper shell section 21. Thus, the indexer wheel 110 can rotate freely up to the point that the jam rib 112 engages the indexer stop 31. When that occurs, further rotation of the indexer wheel 110 is prevented. It will be noted that each rotation of the carriage assembly 40 results in one engagement between the trigger foot 75 and the indexing wheel 110 so as to rotate the indexing wheel 110 one increment.

ATTACHMENT TO THE FISHING LINE

In order to thread a length of fishing line 11 through the float 10 prior to use, it is necessary to depress the reset button 73 until it locks in the latch slot as illustration in FIG. 10. This permits the fishing line to be inserted through the spindle cap 61 and then through the brake mechanism into the interior of the shell assembly 20. Then the upper shell section 21 is rotated until the clinching groove 102 in the drum is exposed within the slot 29.

At this point, the inserted portion of the fishing line 11 is clamped in the groove and the drum is rotated through one full rotation to wrap the fishing line around the drum until the tapered groove is again exposed. Then the line is fed through the shell to the lower spindle assembly 80, through the secondary brake mechanism and out through the exit opening in the lower spindle cap 81. This latter movement is accomplished with the secondary latch button 93 depressed and locked to hold the secondary brake mechanism in a released condition.

Once the threading is completed, however, the latch button 93 is released so that the line cannot be retracted back through the secondary brake mechanism. The selected fishing tackle may then be attached to the end of the fishing line as desired.

METERING OPERATION

To use the metering float 10 to position the end of the fishing line 11 at a desired depth, the user first disengages the reset button 73 from its locked position which permits the trigger arm 74 of the primary brake mechanism to move in the trigger slot 65 to a position where the trigger foot 75 rests against the detent shoulder thus holding the trigger member in a "cocked position" as shown in FIG. 9. In this position, the fishing line 11 can move freely through the primary brake mechanism.

In order to set a desired depth, the upper shell 21 is rotated counter-clockwise as viewed in FIG. 2 relative to the lower shell 22 to a position where the trigger foot 75 is at a desired setting on the depth metering scale. If the desired depth is more than the metering scale provides, the indexer knob 30 is rotated counter-clockwise to a position relative to the indexer scale to provide the additional depth increment desired.

Then the tackle, float and fishing line 11 are cast into the water. The buoyant float 10 rests on the surface while the tackle sinks. As the tackle sinks, it pulls the fishing line 11 first through the secondary brake mechanism tending to rotate the secondary brake operating member 86 clockwise to the position illustrated in FIG. 11. This maintains the secondary brake shoe 89 in a released position and permits the line to pass downwardly through the lower spindle assembly 80.

As further movement of the line occurs, the line rotates the drum 50 to turn the drive gear 105 and idler gear 106. The drive gear 105 in turn rotates the spherical gear 50 (with substantial gear reduction) which causes rotation of the main drive gear 54. Since the main drive gear meshes with the annular gear teeth 39 in the lower shell section 22, the carriage assembly 40 is caused to rotate relative to the shell assembly 20. This latter rotation is accomplished with additional gear reduction so that the rotation of the carriage assembly 40 about the central axis is substantially slower than the rotation of the drum 100. In the present instance, the gear reduction causes one rotation of the carriage assembly 40 per 100 rotations of the drum 100. Accordingly, each rotation of the drum rotates the carriage assembly 3.6°.

It will be noted that each rotation of the carriage assembly 40 causes one engagement between the trigger foot 75 and the indexer wheel 110. In other words, each rotation causes engagement with one indexer rib 111 so that the indexer wheel 110 is indexed 1 increment. This occurs each time the trigger foot 75 moves past the indexer wheel.

Figure 5:
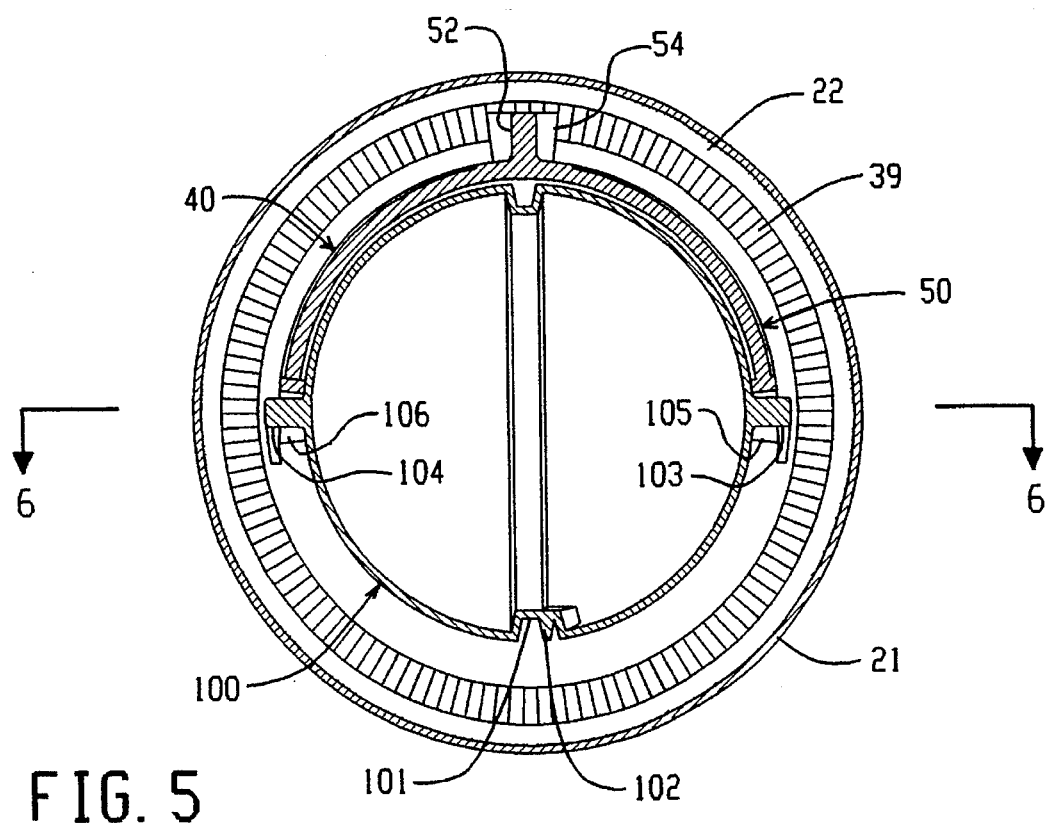
FIG. 5 is a sectional view taken on the line 5—5 of FIG. 3, but showing the upper and lower spindles in elevation.

The carriage assembly 40 continues to rotate counter-clockwise as viewed in FIGS. 5 and 6 as the fishing line 11 passes through the float. Depending upon the setting of the indexer knob 30, the trigger foot 75 eventually strikes the jam rib 112 on the indexer wheel. This pushes the jam rib 112 against the indexer stop 31 and blocks the jam rib 112 from further movement. This stops the indexer wheel 110 and prevents its further rotation and in turn precludes the trigger foot from passing by and rotating the indexer wheel 110.

At this point, the inertia of the carriage assembly applies a sufficient force against the trigger arm 74 to flex it to the left as viewed in FIG. 4. This pushes the trigger foot 75 off of the detent shoulder 76 and permits the trigger arm 74 to move downward to the position illustrated in FIG. 8. Once this occurs, the spring tail 67 forces the brake shoe 69 into engagement with the anvil 63 to engage the fishing line 11 and prevent further passing of the line through the brake mechanism.

With the mechanism in this condition, any tension in the fishing line in a downward direction acts to rotate the primary brake mechanism in a direction that tends to move the brake shoe 69 more firmly against the anvil 63.

When the tackle and fishing line is retrieved and tension is applied in an upward direction relative to the upper spindle assembly 60, a force is transmitted to the trigger bar 70 which tends to rotate the primary brake mechanism against the force of the spring tail 67 to release the brake shoe 69 from the anvil 63. This allows the fishing line to move through the float during retrieval. As the fishing line is retrieved, it rotates the drum 100 in an opposite direction, clockwise as viewed in FIG. 8 to drive the carriage assembly 40 in an opposite (or return) direction of rotation.

DEPTH FINDING OPERATION

As indicated above, the metering float 10 may alternatively be used to determine the overall depth of the water in which the device is placed. In order to accomplish this, the float is positioned on the fishing line 11 as before, just above the tackle or line weight and the reset button 73 is depressed so that the notch is engaged and the button is in a locked position. This holds the brake mechanism in a released condition. The indexer knob 30 is then rotated to set the pointer at the maximum depth position. This position will place the pointer of the indexing knob 30 at 0 on the indexer scale. This positions the first index rib 111 adjacent the indexer stop 31.

The upper shell 21 is then rotated clockwise relative to the lower shell 22 to bring the strike tang 37 against the trigger foot 75. This also causes the depth ring 35 to rotate relative to the upper shell 21. This rotation continues until the indicator groove 37a is positioned at the 0 point on the depth scale as the index tab 38 initially engages the first index rib 111.

The line 11 is then cast into the water and the weight and line are lowered pulling the line through the float 10 until the lower end reaches the bottom. As the line passes through the device, the carriage assembly 40 rotates counter-clockwise as viewed in FIG. 1, and the trigger foot 75 rotates with the carriage assembly to push the strike tang 37 and rotate the depth ring 35 in the upper shell 21 along with the carriage assembly. At the beginning of this rotation, the index tab 38 pushes an index rib 111 clear, rotating the indexing wheel and consequently the indexing knob clockwise as viewed in FIG. 2 positioning the next index rib 111 in sequence.

The carriage assembly 40 and depth ring 35 continue to rotate and intermittently move the index knob 30 one increment at the completion of each rotation. The rotation of the depth ring 35 stops when the line reaches the bottom.

Then the line 11 is retrieved to the float 10 causing the carriage to rotate in the opposite direction and the trigger foot disengages from the strike tang 37 leaving the depth ring 35 in a fixed position in the upper shell. As the carriage assembly continues to rotate, the trigger foot 75 contacts the strike tang 37 along the underside to raise the tang. The frictional force between the tang 37 and the trigger foot 75 is insufficient to rotate the depth ring 35 within the upper shell allowing the trigger foot to continue rotation under and pass the strike tang leaving the depth ring in a fixed position. When the fishing line 11 and float 10 are fully retrieved, the depth of the water can be read on the depth scale as indicated by the position of the indicator groove 37a. Additional depth increments are indicated on the indexer scale adjacent the indexer knob 30.

While the invention has been shown and described with reference to a preferred embodiment thereof, this is intended for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. A depth metering fishing line float for metering a preselected length of fishing line therethrough comprising:

a shell assembly having a central axis and upper and lower shell sections rotatable relative to one another about said central axis, said assembly defining a pair of axially spaced openings, one at each axial end thereof, a carriage assembly located within said shell assembly and having an upper spindle and a lower spindle extending from opposite ends thereof through said respective openings, said carriage assembly being adapted for rotation about said central axis relative to said shell assembly, means for passing a fishing line through said spindles and through the interior of said float, brake means responsive to rotation of said carriage assembly for selectively gripping said fishing line to halt passage thereof through said float, a buoyant drum member journaled in said carriage assembly for rotation about a drum axis perpendicular to said central axis, said drum being operatively engaged by said fishing line to turn said drum member as said fishing line passes through said float, gear train means connecting said drum member to said carriage assembly whereby said carriage assembly turns relative to said shell assembly in response to rotation of said drum member; and trigger means responsive to a predetermined rotation of said carriage for actuating said brake means.

2. A fishing line float as defined in claim 1 wherein said drum member comprises a hollow sphere with a circumferential groove formed therearound in a plane perpendicular to said drum axis and adapted to receive at least one convolution of said fishing line.

3. A fishing line float as defined in claim 2 wherein said drum member has a pair of axial spindles, one extending from each end, said spindles being journaled for rotation in said carriage assembly.

4. A fishing line float as defined in claim 3 including an idler gear mounted for free rotation on one of said spindles and a drive gear fixedly mounted on the other of said spindles.

5. A fishing line float as defined in claim 1 wherein said gear train means comprises a pinion gear operated associated with said drum member for rotation therewith about said drum axis, a spherical ring gear operatively engaged by said pinion gear for rotation about a polar axis perpendicular to said drum axis, said spherical gear having a main drive gear fixedly connected thereto for rotation about said polar axis, said main drive gear having a shaft journaled in said carriage assembly, and gear rack means formed in said shell assembly and operatively engaged by said main gear whereby said carriage is turned about said central axis in response to rotation of said drum member.

6. A fishing line float as defined in claim 5 wherein said pinion gear, said spherical gear, main drive gear and gear rack means produce a substantial gear reduction.

7. A fishing line float as defined in claim 6 where said gear reduction is at least 100:1.

8. A fishing line float as defined in claim 1 wherein said brake means comprises an anvil and brake shoe associated with said upper spindle assembly, said fishing line passing between said anvil and brake shoe, resilient means urging said brake shoe into engagement with said anvil and fishing line, means for retaining said brake shoe in a released position relative to said anvil and trigger means responsive to a predetermined amount of rotation of said carriage assembly for disengaging said retaining means whereby said brake shoe moves into engagement with said anvil, and fishing line.

* * * * *